Oct. 21, 1958     F. S. MACHALK     2,856,746
GRASS CATCHERS FOR ROTARY MOWERS
Filed Dec. 19, 1956     2 Sheets-Sheet 1
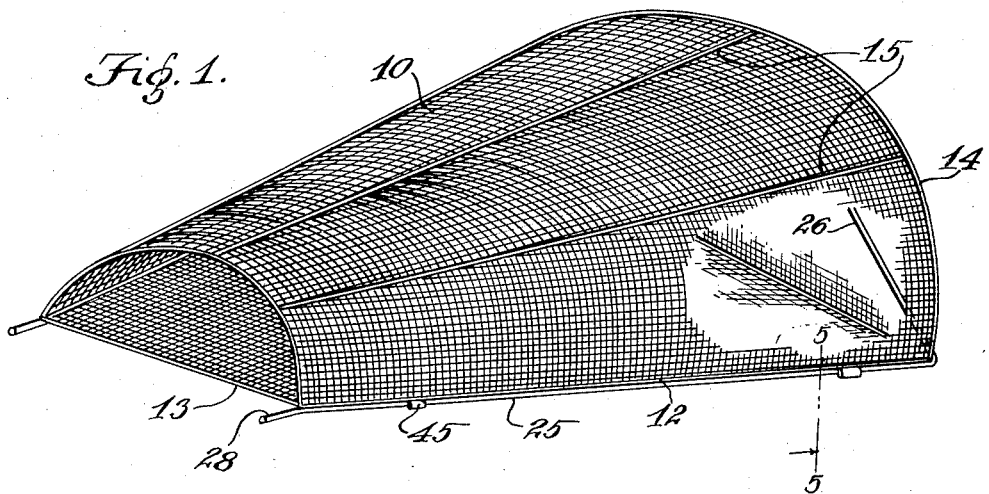
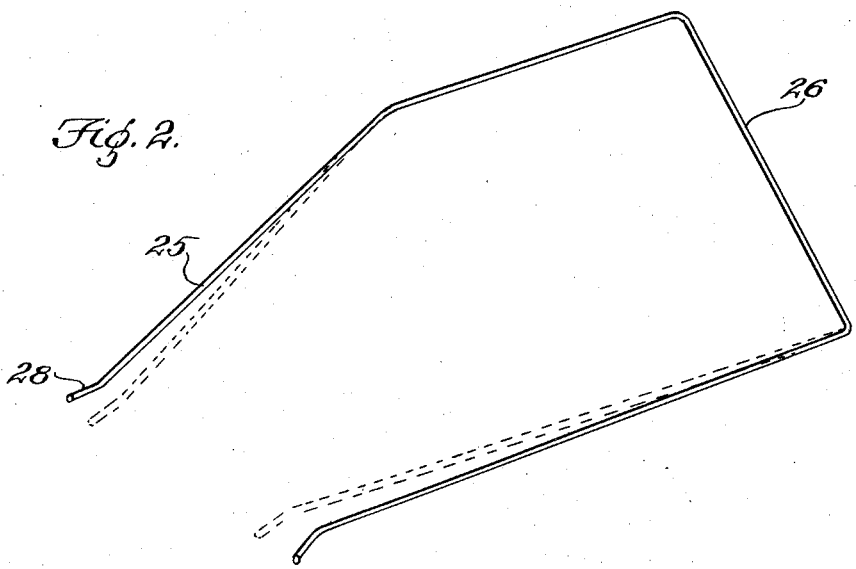
Frank S. Machalk
INVENTOR.
BY Milo B. Stevens & Co
Attorneys.

Oct. 21, 1958
F. S. MACHALK
2,856,746
GRASS CATCHERS FOR ROTARY MOWERS
Filed Dec. 19, 1956
2 Sheets-Sheet 2
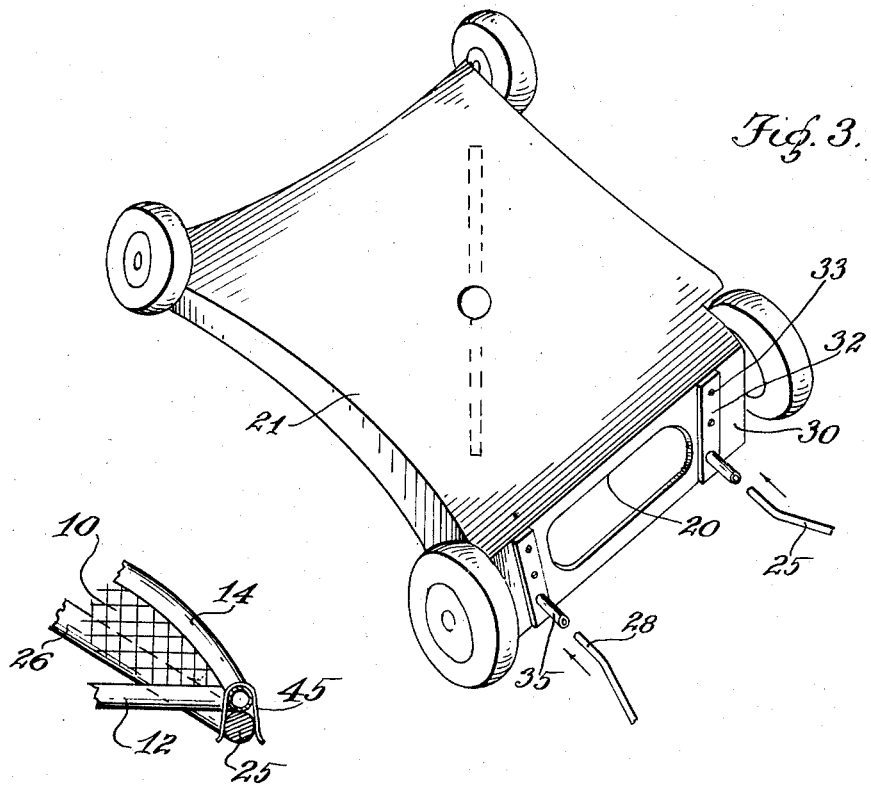
Fig. 3.
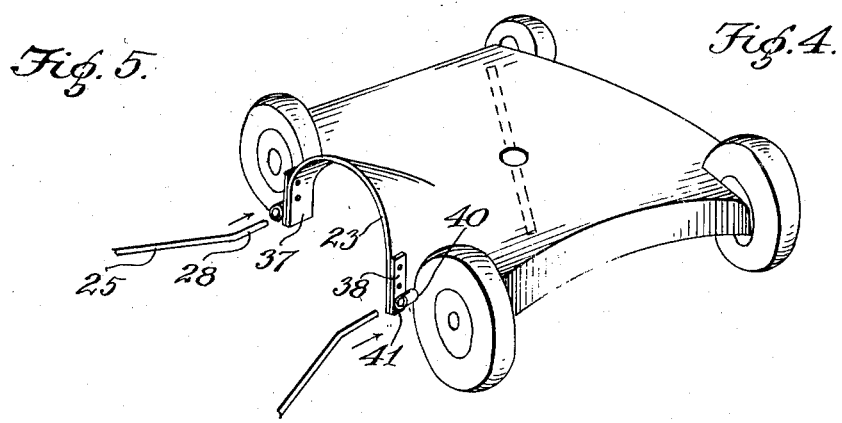
Fig. 5.
Fig. 4.
Frank S. Machalk
INVENTOR.
BY
Milo B. Stevens & Co.
Attorneys.

United States Patent Office 2,856,746
Patented Oct. 21, 1958

2,856,746

GRASS CATCHERS FOR ROTARY MOWERS

Frank S. Machalk, Hammond, Ind.

Application December 19, 1956, Serial No. 629,254

7 Claims. (Cl. 56—202)

My invention relates to rotary mowers, in which a rapidly rotating horizontal blade cuts the grass and throws it through the side or rear of the mower housing, according to the location of the discharge opening therein. Since cut grass cast off by the mower requires raking or sweeping in order to clear the lawn, various forms of catchers or receptacles for such grass have been devised. However, such of these as have come to my attention either have a limited capacity, will fit only a lateral discharge opening, require a door to be opened for emptying, or are in some other respects involved. It is therefore one object of the present invention to depart from these shortcomings and provide a grass catcher which is readily adaptable to either a rear or lateral mower discharge opening.

A further object is to provide a catcher which is sufficiently narrow in its entrance to close around the mower discharge opening, yet so spacious toward the rear that it will receive a large filling of cut grass before it requires emptying.

Another object is to design the improved grass catcher with a factor of expansion from its entrance, so that the capacity of the catcher increases towards its rear end.

An additional object is to construct the catcher with a framework suitable for maintaining its form, such framework being covered with walls of wire screen which retain the cut grass in the catcher while allowing the passage of air projected by the action of the mower.

A still further object is to provide a base for the catcher which not only serves as a support for the same, but also cooperates with means to attach the catcher to the mower.

Another object is to include simple means attachable to the mower for the application of the grass catcher thereto whenever its use is desired.

An important object is to build the catcher from parts which are few and quite simple, whereby to render the manufacturing cost of the same reasonable.

With the above objects in view, a better understanding of the invention may be had by reference to the accompanying drawings, in which—

Fig. 1 is a perspective view of the catcher mounted on its base and in readiness for application to the mower, the view being partly broken away;

Fig. 2 is a perspective view of the catcher base;

Fig. 3 is a perspective view of a mower frame which has a rear discharge opening, showing the means for adapting the improved catcher to the same;

Fig. 4 is a similar view of a mower having a lateral discharge opening; and

Fig. 5 is an enlarged section on the line 5—5 of Fig. 1.

In accordance with the foregoing, specific reference to the drawings indicates the catcher at 10, the body of the same being hollow and constructed largely of wire screen. The screen is wrapped over a framework made of light tubing. Thus, the bottom portion of the framework is indicated at 12, the front portion at 13, the rear portion at 14, and the top braces at 15. The parts of this framework are secured together by welding or other suitable means; and the appearance of the catcher is flat on the bottom, domed on top, and tapered toward the front end.

While the top, bottom and rear walls of the catcher are screened, the front end thereof is open, as seen in Fig. 1, and this is the end which is applicable either to the rear discharge opening 20 of a rotary mower 21 illustrated in Fig. 3 or to the lateral discharge opening 23 of the mower illustrated in Fig. 4. Thus, while the entrance into the catcher conforms to the limited size of the openings referred to, the catcher expands considerably toward its opposite end in order to become a spacious receptacle for the grass discharged from the mower.

For the application of the catcher to the mower, a base illustrated in Fig. 2 is provided. This base is made in the form of an open loop of iron rod material, the sides 25 thereof being intended as supports for the catcher 10. They converge similarly to the catcher body to occupy positions under the side edges thereof as shown in Fig. 1; and the rear portion 26 of the base rises in pitched form to serve as a backing for the catcher. The sides 25 of the base terminate in front with stems 28 which are bent outwardly to a slight extent as shown in Fig. 2.

It is intended that the stems 28 of the catcher base be applied to the mower in order to retain the grass catcher to the same. Where the mower is of the type shown in Fig. 3 with a rear discharge opening 20, the back plate 30 of the mower is utilized as a support for attaching means to which the said stems may be applied. Thus, the same figure shows that the attaching means are a pair of vertical plates 32 secured by screws 33 to the back plate 30. The lower portions of the plates 32 carry rearwardly extending tubular sockets 35 suitable for the insertion of the stems 28 in the manner indicated by arrows in the same figure. In the case of a mower having a lateral discharge opening 23, the side walls 37 of the same are employed for the attachment of plates 38 similar to the plates 32. However, where the sockets 35 of the plates 32 connect endwise with the same, the sockets 40 for the plates 38 are applied sidewise to the outer faces of these plates, such as by welding 41. The sockets 40 are therefore positioned to receive the catcher stems 28 from the side, as indicated by arrows in Fig. 4.

Full lines in Fig. 2 indicate the form of the catcher base 25 when it is apart from the catcher. In this form, the stems 28 are farther apart than the spacing of the sockets 35 or 40. Therefore, the base sections must be sprung in inward direction to positions such as indicated by dotted lines in Fig. 2 in order to become parallel and suitably positioned for entering the sockets 35 or 40. However, when the stems have been inserted in the sockets, their outward tension holds them in firm engagement with the same, so that the base 25 remains connected with the mower. The bottom dimensions of the catcher 10 are identical with those of the base after it has been connected with the sockets; and the catcher carries suitable clips 45 or other means to hold the catcher against sliding off its base. It is understood that such clips or other holding devices will not operate to the prejudice of the strong tension exerted by the base stems 28 to hold their firm engagement with the sockets 35 or 40.

It will now be apparent that the novel catcher is an accessory which applies as a unit to the mower, the adapting feature of the base stems and attaching plates making the catcher suitable for application either to a rear discharging mower or a laterally discharging one.

When the mower is in action, the catcher not only covers the immediate area of discharge, but expands in rearward direction to form a much larger receptacle which has the capacity to hold a sizable amount of cut grass, permitting the mower to be used for a long period before the grass catcher must be emptied. At such time, it need only be raised off its base and pointed downwardly, no opening of a door being required. Further, the flat construction of the catcher bottom makes it convenient to hold the catcher between the hands during the emptying operation. The base may remain connected to the mower until the catcher is replaced. However, in case the mowing has been completed, the base is simply pulled out of the mower sockets. When the catcher is to be used again, the base is applied in the manner stated before, and the catcher set in readiness for operation by mounting it on the base. Further, the framework of the catcher is light and strong, and it has a sufficient number of braces between its front and rear ends to line and support the wire screen cover firmly. Finally, the simple nature of the catcher and its connecting parts favor its production at relatively low cost.

While I have described the invention along specific lines, various minor changes or refinements may be made therein without departing from its principle, and I reserve the right to employ all such changes and refinements as may come within the scope and spirit of the appended claims.

I claim:

1. In combination: a lawn mower of the horizontal propeller type having a housing provided with means defining a side opening through which some of the cut grass is adapted for discharge, a first fitting carried by said means, a substantially rigid frame having a complementary fitting detachably connected to said first fitting, and a screen basket mounted on said frame and provided with an opening registering with the opening in the housing.

2. In combination: a lawn mower of the horizontal propeller type having a housing provided with a side wall having an opening therein through which some of the cut grass is adapted for discharge, a first pair of fittings carried by the housing and a frame having a second pair of fittings attachable to the fittings on the housing, said fittings providing the sole means for supporting the frame at a predetermined level, and a screen basket mounted on the frame and provided with an opening registering with the opening in the side wall of the housing.

3. The structure defined in claim 2, in which the first pair of fittings are carried by the side wall and the frame includes side rails having the second pair of fittings thereon, and means on said frame for holding the opening in the basket in close registering relationship with the opening in said side wall.

4. The structure defined in claim 2, in which the fittings are of the prong and socket type to facilitate connection between the frame and housing.

5. The structure defined in claim 2, including means engaging the basket and frame serving to detachably hold the basket in operative relationship to the frame and housing to maintain the openings in axial alignment.

6. The structure defined in claim 2, in which the frame is generally U-shaped to provide flexible side rails having the second fittings thereon so as to facilitate attachment of these fittings with the first pair of fittings on the housing.

7. The structure defined in claim 2, including two pairs of wheels supporting the housing with the opening in the housing and the pair of fittings thereon being disposed between one pair of wheels.

References Cited in the file of this patent

UNITED STATES PATENTS

| | | |
|---|---|---|
| 1,244,341 | Koehli | Oct. 23, 1917 |
| 1,490,857 | Schilling | Apr. 15, 1924 |
| 2,747,356 | Peterson | May 29, 1956 |